US008823266B2

(12) United States Patent
Qin

(10) Patent No.: US 8,823,266 B2
(45) Date of Patent: Sep. 2, 2014

(54) LIGHT REGULATABLE LED ILLUMINATION LAMP

(75) Inventor: Bing Qin, Ningbo (CN)

(73) Assignee: Ningbo Huadian Envirotech Co., Ltd., Ningbo (CN)

( * ) Notice: Subject to any disclaimer, the term of this patent is extended or adjusted under 35 U.S.C. 154(b) by 28 days.

(21) Appl. No.: 13/807,521

(22) PCT Filed: Dec. 27, 2010

(86) PCT No.: PCT/CN2010/002164
§ 371 (c)(1),
(2), (4) Date: Feb. 13, 2013

(87) PCT Pub. No.: WO2012/000159
PCT Pub. Date: Jan. 5, 2012

(65) Prior Publication Data
US 2013/0134875 A1    May 30, 2013

(30) Foreign Application Priority Data

Jun. 28, 2010    (CN) ...................... 2010 2 0244529 U

(51) Int. Cl.
*H01J 1/52*    (2006.01)
*H05B 33/08*    (2006.01)
*H05B 37/02*    (2006.01)

(52) U.S. Cl.
CPC ........ *H05B 33/0833* (2013.01); *H05B 33/0851* (2013.01); *H05B 37/0272* (2013.01); *H05B 33/0884* (2013.01); *H05B 33/0809* (2013.01)
USPC ............. 315/85; 315/293; 315/152; 315/120; 315/51

(58) Field of Classification Search
CPC .................................................. H05B 33/0833
USPC ............................. 315/85, 51, 152, 120, 293
See application file for complete search history.

(56) References Cited

U.S. PATENT DOCUMENTS

| | | | |
|---|---|---|---|
| 7,029,145 B2 * | 4/2006 | Frederick ...................... | 362/234 |
| 7,333,027 B2 * | 2/2008 | Bourgault ..................... | 340/907 |
| 8,299,721 B2 * | 10/2012 | Smith ........................... | 315/291 |
| 8,362,713 B2 * | 1/2013 | Recker et al. ................. | 315/293 |
| 8,491,159 B2 * | 7/2013 | Recker et al. ................. | 362/276 |
| 8,502,454 B2 * | 8/2013 | Sadwick ........................ | 315/51 |
| 8,610,761 B2 * | 12/2013 | Haisty et al. .................... | 348/51 |
| 2010/0271802 A1 * | 10/2010 | Recker et al. ................... | 362/20 |
| 2010/0308664 A1 * | 12/2010 | Face et al. ...................... | 307/104 |
| 2011/0210670 A1 * | 9/2011 | Sauerlander et al. ......... | 315/120 |
| 2012/0025717 A1 * | 2/2012 | Klusmann et al. ............ | 315/152 |

* cited by examiner

*Primary Examiner* — Douglas W Owens
*Assistant Examiner* — Srinivas Sathiraju
(74) *Attorney, Agent, or Firm* — Wang Law Firm, Inc.; Li K. Wang; Stephen Hsu

(57) ABSTRACT

A dimming LED lamp having an LED light, an EMI circuit, a power-factor correction circuit, a digital switching power supply circuit, a dimming control circuit, a power supply circuit, a signal acquisition circuit, an MCU microcontroller, a RF wireless transmitter, a RF receiver circuit, an EEPROM memorizer, and a fan circuit. The brightness of the dimmable LED lamp can be dimmed through any conventional incandescent dimmers, or through any ordinary key switch, or through a wireless transmitter. The wireless transmitter can also remotely turn on the lamps or turn off the lamps, at the same time the LED lamp also has the function of brightness saving. The fan circuit uses air convection to cool the LED which has the advantages of aesthetically pleasing appearance, small size, light weight, low cost, long life, and good cooling effect.

3 Claims, 2 Drawing Sheets

LIGHT REGULATABLE LED ILLUMINATION LAMP

CROSS REFERENCE TO RELATED PATENT APPLICATION

The present application is a PCT application No. PCT/CN2010/002164 entering the U.S.A. national stage and claiming the priority of the Chinese patent application No. 201020244529.5 filed on Jun. 28, 2010.

FIELD OF THE INVENTION

The present invention relates to a kind of a dimmable LED lamp.

DESCRIPTION OF THE PRIOR ART

The existing dimmable lamp can adjust the LED light directly through a traditional dimmer used in the incandescent lamp, or through a key switch, for instance, the technology in Chinese Patent CN201479444 (Patent No.: ZL200920192546.6); or by remote control, for instance, the technology in Chinese Patent CN201219323 (Patent No.: ZL 200820086672.9). However, there is no such a dimmable LED lamp which can be applied simultaneously with traditional dimmer, key switch and remote control to adjust the LED light.

SUMMARY OF THE INVENTION

It is an object of the present invention to provide a dimmable LED lamp which has the function of saving the brightness value, and can dim through any traditional dimmer used in the incandescent lamp, or through any conventional key switches, or even through the wireless transmitter to remote control the light.

For achieving this object, the dimmable LED lamp, comprises:
  a LED lamp having a signal input;
  an EMI circuit having a signal input and a signal output, the signal input being connected to two ends of an external power supply via a button switch or a conventional dimmer, for providing surge-absorption protection and lightning-resistance protection;
  a power-factor correction circuit having a signal input and a signal output, the signal input of the power-factor correction unit being connected to the signal output of the EMI circuit;
  a digital switching power supply circuit having a signal input and a signal output, the signal input of the digital switching power supply circuit being connected to the signal output of the power-factor correction circuit, for providing regulated D.C. power supply to the LED lamp and PWM signals;
  a dimming control circuit, having a signal input connected to the signal output of the digital switching power supply circuit, for providing different working voltages according to the PWM signals received from the digital switching power supply circuit, the output signal of the dimming control circuit being connected to the signal input of the LED lamp;
  a power supply circuit, having a signal input and output, the signal input of the power supply circuit being connected to the signal output of the digital switching power supply circuit, for providing a regulated current to a MCU microcontroller, a EEPROM memorizer and a RF receiver circuit;
  a signal acquisition circuit, having a signal input and an output, the signal input of the signal acquisition circuit being connected to the output of the EMI circuit and the output of the signal acquisition circuit being connected to the MCU microcontroller;
  the MCU microcontroller, having an output connected to the signal input of the dimming control circuit, the MCU microcontroller being able to judge whether the LED lamp is connected with two ends of the external power supply according to signals received from the signal acquisition circuit, the MCU microcontroller also being able to control widths of the PWM signals;
  a RF wireless transmitter for transmitting wireless signals for dimming the LED lamp;
  the RF receiver circuit, having an output, for receiving the wireless signals from the RF wireless transmitter, the output of the RF receiver circuit being connected to the MCU microcontroller;
  the EEPROM memorizer, connected to the MCU microcontroller, for saving a current luminance of the LED lamp; and
  a fan circuit connected to the output of the power supply circuit.

As a preference, the signal acquisition circuit is composed of two serial resistors, the output of the signal acquisition circuit is connected to a zero-crossing detection pin of the MCU microcontroller As a preference, the LED lamp is composed of a plurality of high-power LEDs connected in series Compared with the prior art, in the present invention, the brightness of the LED lamp can be dimmed through any traditional dimmers used in the incandescent lamp, or through any conventional key switches, or even through the wireless transmitter; of course, the wireless transmitter can also remote control to turn on the LED lamp or turn off the LED lamp, at the same time the dimmable LED lamp of the present invention has the function of brightness saving.; The existing LED lamp uses a metal housing as a radiator for LED, but the metal housing is bulky, and with heavy weight, and poor cooling effect, while in the present invention, a special fans is used to cool the LED under the air convection, it has the advantages of beautiful appearance, small size, light weight, low cost, long life, and good cooling effect.

DETAILED DESCRIPTION OF THE PREFERRED EMBODIMENT

Figure 1:
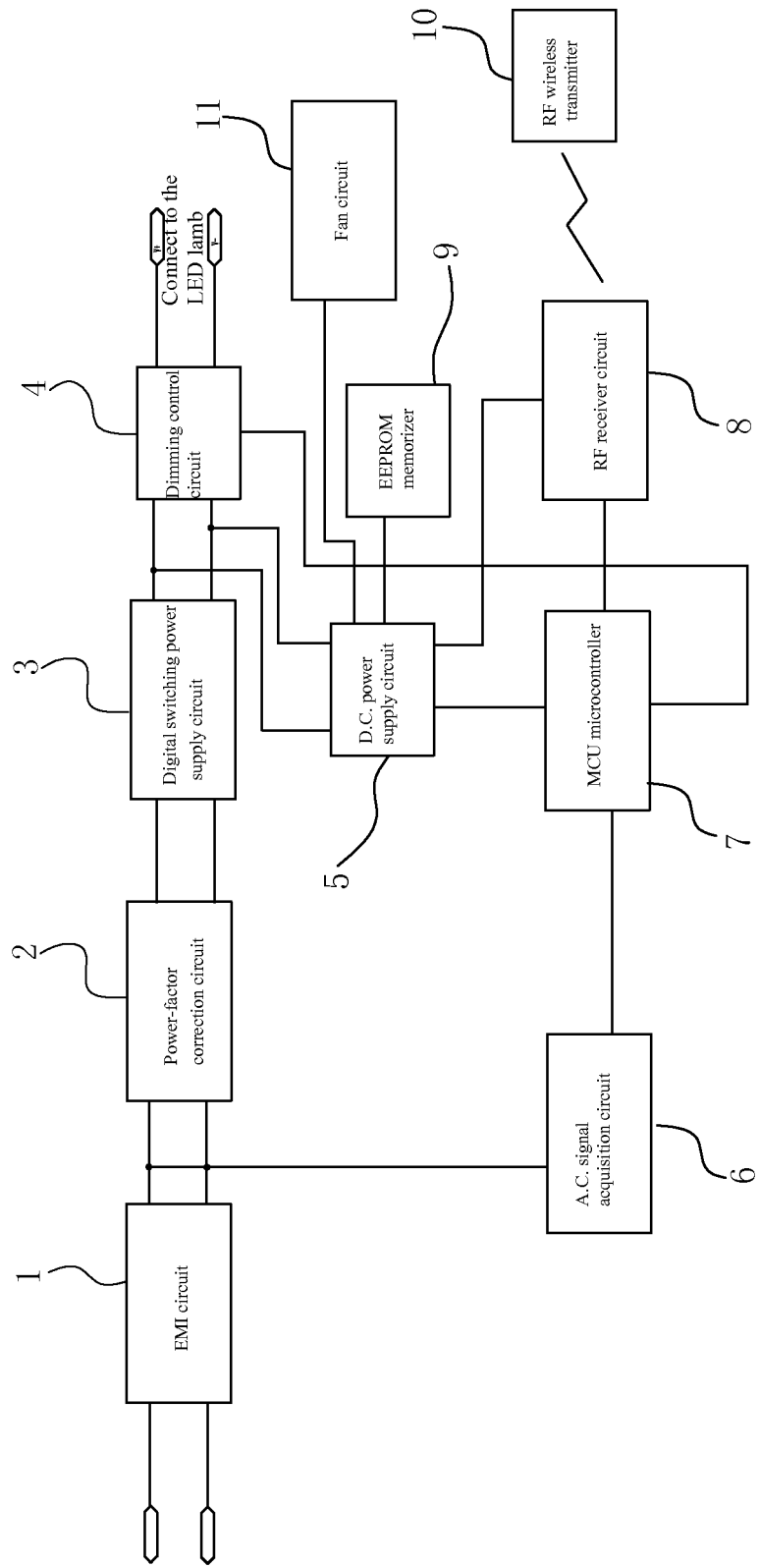
FIG. 1 is a design view of the circuit of the dimmable LED lamp in accordance with an embodiment of the present invention.
Figure 2:
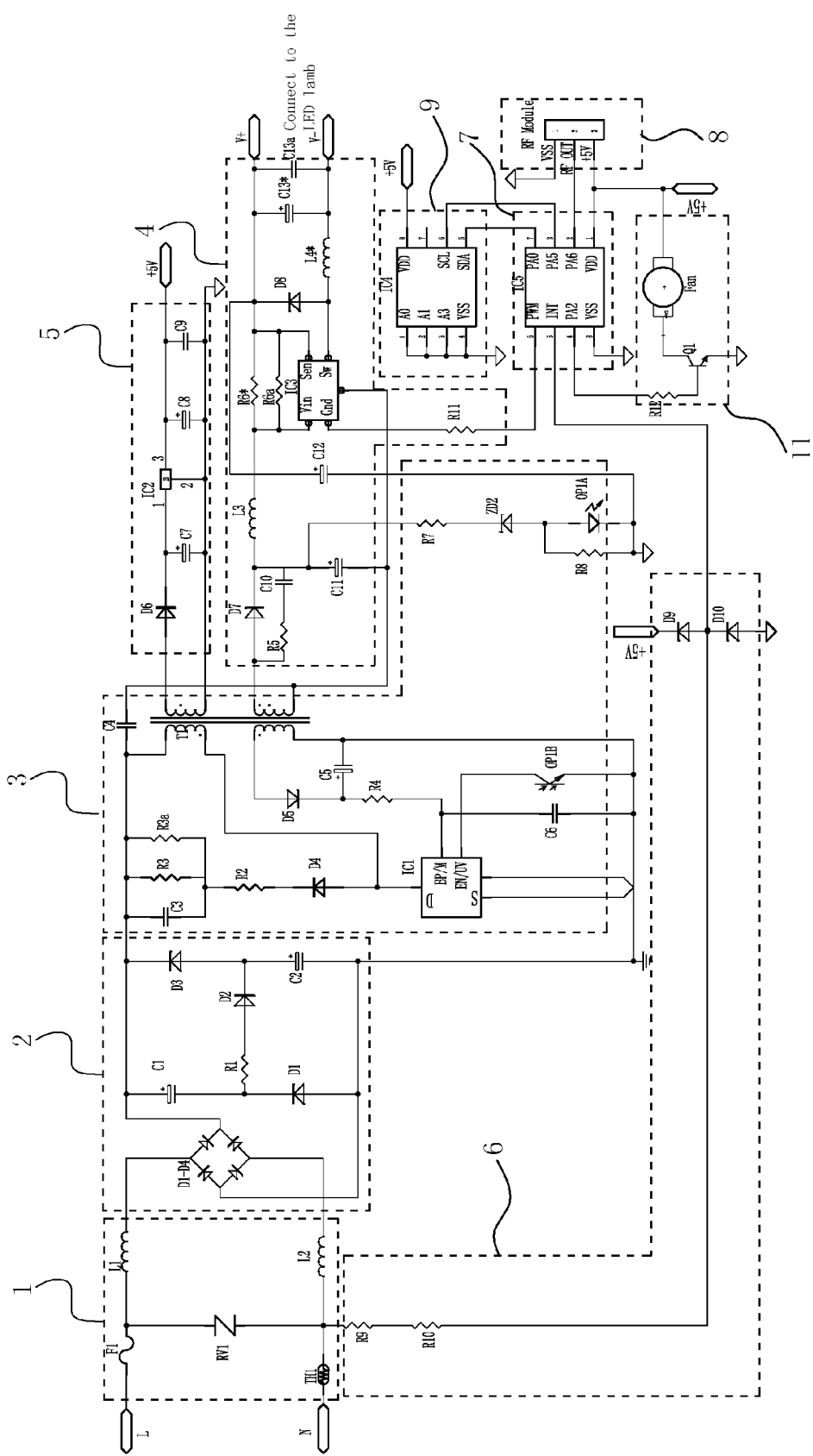
FIG. 2 is a circuit schematic view of the dimmable LED lamp in accordance with the embodiment of the present invention.

To enable a further understanding of the innovative and technological content of the invention herein, refer to the detailed description of the invention and the accompanying drawings below:

FIG. 1 and FIG. 2 show a preferred embodiment of the present invention. The dimmable LED lamp comprises a LED lamp, an EMI circuit resistance to electromagnetic interference, a power-factor correction circuit, a digital switching power supply circuit, a LED dimming control circuit, a D.C. power supply circuit, a MCU microcontroller, an EEPROM memorizer, an A.C. signal acquisition circuit, a fan circuit, a RF receiver circuit, and a RF wireless transmitter.

In the embodiment, the dimmable LED lamp is composed of a plurality of high-power LEDs which are connected in series, it has the advantages of high brightness, low power consumption, and long life, and it is becoming a mainstream choice for the customer in lighting industry.

The signal input of the EMI circuit 1 is connected with two ends of a power supply via a button switch or a conventional dimmer, to make the dimmable LED lamp in conformity with the safety requirements for electromagnetic compatibility, and provide a surge-absorption protection and a lightning-resistance protection at the moment that the power supply is connected or disconnected. In the embodiment, the EMI circuit 1 uses a conventional circuit, and the specific circuit schematic of the EMI circuit 1 is shown in FIG. 2.

The signal input of the power-factor correction circuit 2 is connected with the signal output of the EMI circuit 1. In the embodiment, the power-factor correction circuit 2 uses a conventional circuit, and the specific circuit schematic of the power-factor correction circuit is shown in FIG. 2. The power-factor correction circuit 2 can make the power factor of the dimmable LED lamp reach 0.95%, reduce the reactive power consumption of the dimmable LED lamp, and make the dimmable LED lamp more energy efficient to in line with the global advocate of low-carbon action.

The signal input of the digital switching power supply circuit 3 is connected with the signal output of the power-factor correction circuit 2 to provide a regulated D.C. power supply for the LED lamp. The digital switching power supply circuit 3 of the embodiment uses a conventional circuit, and the specific circuit schematic of the digital switching power supply circuit 3 is shown in FIG. 2. The digital switching power supply circuit 3 provides a precision DC power, while the ripple factor is controlled to be about 2%, and the conversion efficiency reaches 90%. This high quality circuit supports the light-emitting efficiency, color rendering, and the work life of the LED.

The signal input of the dimming control circuit 4 is connected with the signal output of the digital switching power supply circuit to output different working voltages depending on the PWM signals received from the digital switching power supply circuit at various widths. And the signal output of the dimming control circuit 4 is connected with the signal input of the LED lamp. In the embodiment, the dimming control circuit 4 uses a conventional circuit, and the specific circuit schematic of the dimming control circuit 4 is shown in FIG. 2. The dimming control circuit 4 provides a good linear from 0% to 100% of the brightness control.

The signal input of the D.C. power supply circuit 5 is connected with the signal output of the digital switching power supply circuit 3 to provide a regulated D.C. working power supply for the MCU microcontroller 7, the EEPROM memorizer 9 and the RF receiver circuit 8. The D.C. power supply circuit 5 of the embodiment uses a conventional circuit 5, and the specific circuit schematic of D.C. power supply circuit 5 is shown in FIG. 2.

The signal input of the A.C. signal acquisition circuit 6 is connected with the output of the EMI circuit 1, the output is connected with one of the inputs of the MCU microcontroller 7. The A.C. signal acquisition circuit 6 is composed of two resistors concatenation, and the output terminal of the A.C. signal acquisition circuit 6 is connected to the zero crossing detection pin of the MCU microcontroller 7 to detect the zero-crossing signal.

The output of the MCU microcontroller 7 is connected with the dimming control circuit 4, depending on the A.C. signals received from the A.C. signal acquisition circuit 6, the MCU microcontroller 7 can judge whether the LED lamp is connected with two ends of the power supply via the conventional dimmer or the button switch, and then under the running of the application software pre-loaded therein, the signal output of the MCU microcontroller 7 can output the corresponding widths of PWM signals, the signal output of the MCU microcontroller 7 is connected with the signal input of the dimming control circuit 4. The MCU microcontroller 7 uses a conventional single-chip controller, which contains the zero crossing detector circuit, and stores in advance to have the dimmer control program software. The specific circuit schematic of the MCU microcontroller 7 is shown in FIG. 2.

The RF wireless transmitter 10 is used for transmitting the wireless signals at least for dimming. The RF wireless transmitter 10 uses the internationally accepted 434 Mhz/315 Mhz/2.4 Ghz channel RF to work, in the embodiment, it uses conventional wireless transmitters, independently mounted in a plastic housing with a dry battery or button battery power, and the wireless control distance of the RF wireless transmitter 10 is within 100 meters.

The RF receiver circuit 8 is used for receiving the wireless signals at least for dimming, of which the output is connected with one of the inputs of the MCU microcontroller 7. The RF receiver circuit 8 uses the internationally accepted 434 Mhz/315 Mhz/2.4 Ghz channel RF to work, and in the embodiment, it uses a conventional circuit. The specific circuit schematic of the RF receiver circuit 8 is shown in FIG. 2

The EEPROM memorizer 9 is used for saving the current luminance of the LED lamp, which is connected with the MCU microcontroller 7. The EEPROM memorizer 9 uses a conventional circuit, and the specific circuit schematic of the EEPROM memorizer 9 is shown in FIG. 2.

The power supply input of the fan circuit 11 is connected with the output of the D.C. power supply circuit 5; it is a conventional circuit including a small fan. Due to the characteristics of the light-emitting principle, the LED lamp is severely heated when the LED lamp is working. Currently, the existing LED lamp uses a metal housing as a radiator for LED, but the metal housing is bulky, heavy weight, high cost, and limits the promotion and popularization of the LED lamp. However, in this embodiment, it has effect significant advantage of light weight, low cost, and good heat dissipation to use a fan that is high life, low noise, and low power consumption.

When the dimmable LED lamp works with a conventional dimmer, the dimmer principle is based on the traditional dimmer control the time length of AC signal over the zero conduction which is detected by the MCU's internal timer, and then output the corresponding frequency of the PWM signal, to achieve regulating traditional dimmer function to control the brightness of LED lamb. When the time length of AC signal over the zero conduction is detected to be less than a fixed value, the PWM output is zero, the LED will turn off, in other words, when the conventional dimmer output voltage is too low, the LED will turn off automatically to avoid the critical state of the LED that the LED repeated light and off, and protect the LED.

When the dimmable LED lamp works with a conventional dimmer, and the dimming control function of the remote control may not work, but the LED light can still be turned on and off by the remote control, which need the output voltage of the dimmer is greater than the threshold voltage of the LED.

When the dimmable LED lamp works with an ordinary key switch, the MCU achieves the function of selecting switch dimmer with any brightness through the method of detecting the AC signal and MCU-specific data storage unit, and employing the brightness saving value of the EEPROM after the power-on-reset, while save the selected brightness value in the EEPROM. After the switch has completed the brightness selection, the MCU can receive the remote control signals of the RF transmitter to remote control, turn on the lamp, and turn off the lamp. The RF transmitter supporting the use of the MCU has a function of coded identification and coding learning, to make the RF transmitter and the MCU exclusive, and to avoid error emitting and error controlling.

What is claimed is:

1. A dimmable LED lamp, comprising
a LED lamp having a signal input;
an EMI circuit having a signal input and a signal output, the signal input being connected to two ends of an external power supply via a conventional dimmer, for providing surge-absorption protection and lightning-resistance protection;
a power-factor correction circuit having a signal input and a signal output, the signal input of the power-factor correction unit being connected to the signal output of the EMI circuit;
a digital switching power supply circuit having a signal input and a signal output, the signal input of the digital switching power supply circuit being connected to the signal output of the power-factor correction circuit, for providing regulated D.C. power supply to the LED lamp and PWM signals;
a dimming control circuit, having a signal input connected to the signal output of the digital switching power supply circuit, for providing different working voltages according to the PWM signals received from the digital switching power supply circuit, the output signal of the dimming control circuit being connected to the signal input of the LED lamp;
a power supply circuit, having a signal input and output, the signal input of the power supply circuit being connected to the signal output of the digital switching power supply circuit, for providing a regulated current to a MCU microcontroller, a EEPROM memorizer and a RF receiver circuit;
a signal acquisition circuit, having a signal input and an output, the signal input of the signal acquisition circuit being connected to the output of the EMI circuit and the output of the signal acquisition circuit being connected to the MCU microcontroller; the MCU microcontroller, having an output connected to the signal input of the dimming control circuit, the MCU microcontroller being able to judge whether the LED lamp is connected with two ends of the external power supply according to signals received from the signal acquisition circuit, the MCU microcontroller also being able to control widths of the PWM signals;
a RF wireless transmitter for transmitting wireless signals for dimming the LED lamp;
the RF receiver circuit, having an output, for receiving the wireless signals from the RF wireless transmitter, the output of the RF receiver circuit being connected to the MCU microcontroller;
the EEPROM memorizer, connected to the MCU microcontroller, for saving a current luminance of the LED lamp; and
a fan circuit connected to the output of the power supply circuit.

2. The dimmable LED lamp of claim 1, wherein the signal acquisition circuit is composed of two serial resistors, the output of the signal acquisition circuit is connected to a zero-crossing detection pin of the MCU microcontroller.

3. The dimmable LED lamp of claim 1 or 2, wherein the LED lamp is composed of a plurality of high-power LEDs connected in series.

* * * * *